(No Model.)
G. H. ST. JOHN.
HORSE BOOT.
No. 349,668. Patented Sept. 21, 1886.
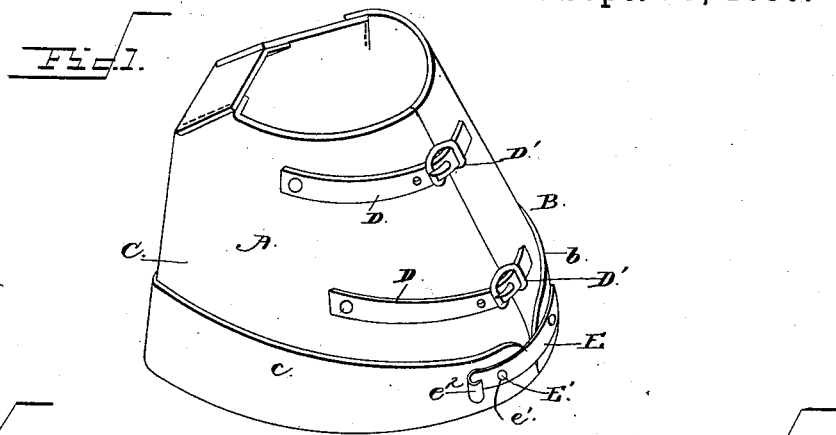
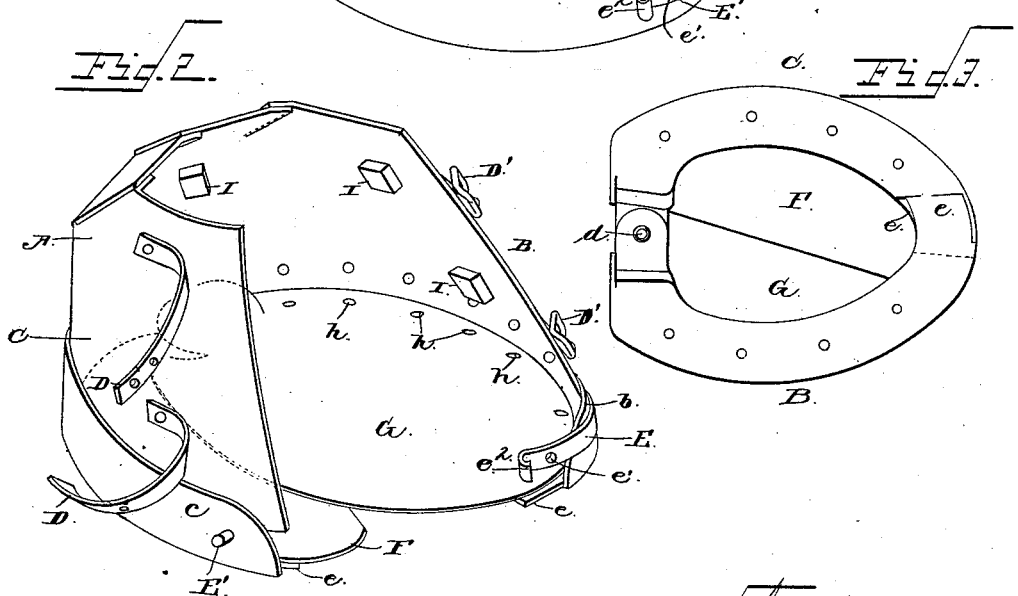
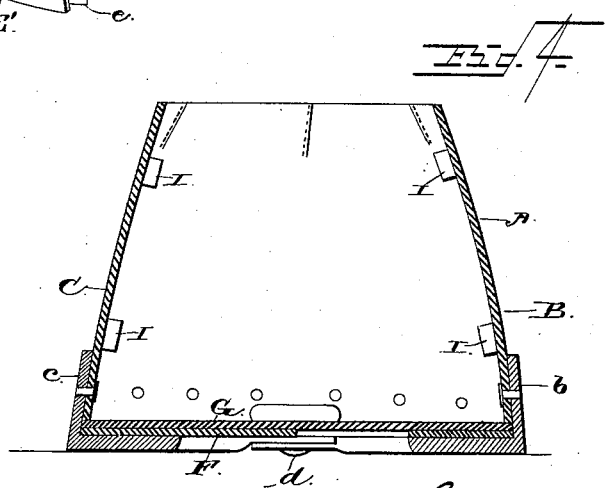
Witnesses
M. E. Fowler
W. F. Bernhard
Inventor
Geo. H. St. John
By his Attorneys
C. A. Snow & Co.

UNITED STATES PATENT OFFICE.

GEORGE H. ST. JOHN, OF LEONARDSVILLE, NEW YORK.

HORSE-BOOT.

SPECIFICATION forming part of Letters Patent No. 349,669, dated September 21, 1886.

Application filed May 27, 1886. Serial No. 203,445. (No model.)

*To all whom it may concern:*

Be it known that I, GEORGE H. ST. JOHN, a citizen of the United States, residing at Leonardsville, in the county of Madison and State of New York, have invented a new and useful Improvement in Horse-Boots, of which the following is a specification.

My invention relates to improvements in horse-boots; and it consists of the peculiar combination and novel construction and arrangement of the various parts for service, substantially as hereinafter fully set forth, and specifically pointed out in the claims.

The object of my invention is to provide an improved horse-boot that can be readily and easily adjusted upon a horse's hoof and as readily detached therefrom, to provide means for applying a poultice or medicaments to the hoof for the purpose of curing contracted and hardened feet, and which can be worn with ease by the animal while it is in the field or stable, and which shall obviate the use of tubs of water in which to immerse the animal's hoof for the cure of the above-named diseases, and to provide a boot which shall effectually exclude water from entering the same, and be simple and strong in construction and cheap of manufacture.

In the recompanying drawings, Figure 1 is a perspective view of a horse-boot embodying my invention, showing the device closed. Fig. 2 is a similar view showing the boot opened to receive a hoof of an animal. Fig. 3 is a bottom plan view of the device. Fig. 4 is a vertical sectional view through the middle of the boot.

Referring to the drawings, in which like letters of reference denote corresponding parts in all the figures, A designates the inclosing case or jacket of my improved horse-boot, which is made of rubber, leather, or other suitable pliable material and in the shape or form to closely approximate to the shape of the animal's hoof to which it is applied. The lower edges of the inclosing jacket are secured, by means of rivets or other like devices, to vertical flanges $b$ and $c$ of the sections B and C of the horseshoe, by which the jacket is carried.

The horseshoe-sections B and C are made in the form of one half of a horseshoe of the ordinary class, and at one end the sections are pivotally connected together, so that they can be expanded or moved laterally of each other, by means of a pin or rivet, $d$, while the opposite free ends of the sections are cut away on opposite edges to form tongues $e$, which overlap one another when the device is adjusted for use upon a hoof. The flanges $b$ and $c$ of the horseshoe-sections are formed integral with their respective sections and project upwardly therefrom and at right angles thereto, and the rivets that secure the lower edges of the jacket to the flanges pass through the jacket and the flanges, as will be readily seen. The upper edges of the jacket are slitted and secured together, so that the jacket will conform to the shape of the animal's hoof, and the free edges of the jacket, which is left open at one side, are detachably connected or secured together by means of straps and buckles D and D', respectively, which are of the ordinary form and secured to the jacket by rivets or other suitable means.

The sections B and C of the shoe are detachably connected together at their free edges by means of a spring or clasp, E, one end of which is rigidly secured to one of the sections, preferably the section B, and the other end thereof is provided with an opening, $e'$, which is adapted to engage with a stud or pin, E', that is secured to the other section of the horseshoe. When the sections of the shoe are brought together in securing it upon a hoof, the free end of the spring or clasp rides upon the stud or pin until the opening therein comes in line with the stud, in which position the pin will readily enter the said opening; and to release the spring or clamp from engagement with the pin and open the sections of the shoe, it is only necessary to elevate the free end of the spring or clamp from engagement with the pin and then force the sections of the shoe away from each other, the free end of the said spring or clamp being turned or bent upon itself to provide a finger-piece, $e^2$.

To prevent the admission of water and other liquids or matter into the boot when it is applied and worn upon a horse's hoof, the bottom of the boot is provided with a flexible sheath, which comprises two sections, F and G, which are secured at their edges to the sections of the shoe by means of rivets $h$, or other suitable fastening devices. The sections are each made of a single piece of rubber, leather, or other-like pliable material, the section F being only one-half the size of the section G. The section G extends entirely across the bottom of the boot when the shoe-sections B and C are closed together, and it overlaps the section F, as shown, so that water is effectually prevented from entering the boot.

The inclosing jacket or case of the boot is provided on its inner surface with lugs I, which are suitably secured thereto and serve to prevent the said jacket from coming in contact with the hoof of the animal when the boot is fitted on the hoof.

It will be seen that a space is provided between the jacket and the animal's hoof in which a poultice or other medicament can be placed to cure contracted or hardened frogs or hoofs, and that the boot effectually excludes water from the medicament and can be worn with ease by the animal when it is in the field or stable.

To apply my improved horse-boot to an animal's hoof the sections B and C of the shoe are separated and the free edges of the jacket are likewise opened by disengaging the spring or clamp and the straps from the buckles, and the hoof can then be easily fitted or adjusted in the boot. The shoe-sections are now closed together and locked by the spring or clamp, and the straps are engaged with the buckles, whereby the boot is securely held upon the hoof.

Various slight changes in the form and proportion of parts can be made without departing from the principle of my invention.

I am aware that it is not new to provide a horse-boot which consists of two pivoted shoe-sections and an open pliable jacket secured to the said sections, and provided with buckles or straps to secure the meeting edges of the jacket together, as such a device is shown in Patent No. 200,273, dated February 12, 1878.

My invention differs from the device above described, in that I provide the free end of one of the pivoted shoe-sections with a clamp, which is adapted to engage the corresponding end of the other shoe-section to detachably connect the free ends of the said shoe-sections very firmly together, whereby the boot is more firmly secured upon the hoof of the animal and is not liable to be easily detached therefrom.

I am also aware that it is not new to provide a horse-boot with a jacket, a metallic sole, which is of the same size as the lower larger part of the jacket, and straps for securing the jacket and sole together upon the hoof. In my improved device I provide the pivoted shoes with two pliable sheath-sections, F G, which are permanently affixed to the shoe-sections and which overlap one another, and are inclosed completely within the jacket to prevent the escape of the medicament that is applied to the hoof, and also exclude water and other matter from the jacket and hoof.

Having thus described my invention, what I claim as new, and desire to secure by Letters Patent, is—

1. In a horse-boot, the combination of the pivoted shoe-sections, a spring arm or clamp, E, affixed to the free end of one of the said sections and adapted to be connected to a stud on the other section to detachably connect the said sections together, an open pliable jacket secured to the shoe-sections, and the fastening devices for securing the meeting edges of the jacket together, for the purpose set forth.

2. In a horse-boot, the combination of the pivoted shoe-sections, a spring-clamp carried by one of the said sections at its free end to detachably connect the sections together, a jacket secured to the shoe-sections, and the pliable sheath-sections F G, secured to the shoe sections and overlapping one another, substantially as described, for the purpose set forth.

3. A horse-boot consisting of the pivoted shoe sections, a pliable jacket carried thereby, the projecting lugs or flanges I on the inner sides of the jacket, and the fastening devices for detachably connecting the free ends of the shoe-sections and the meeting edges of the jacket, substantially as described, for the purpose set forth.

In testimony that I claim the foregoing as my own I have hereto affixed my signature in presence of two witnesses.

GEORGE H. ST. JOHN.

Witnesses:
E. D. COMSTOCK,
S. L. HUNTINGTON.